Aug. 19, 1941.         R. WIDMER         2,253,258
FILM GATE ADJUSTABLE FOR FILMS OF DIFFERENT WIDTHS
Filed Aug. 12, 1939         2 Sheets-Sheet 1

INVENTOR
Rene Widmer;
BY Wolhaupter & Groff
ATTORNEYS

Aug. 19, 1941.  R. WIDMER  2,253,258
FILM GATE ADJUSTABLE FOR FILMS OF DIFFERENT WIDTHS
Filed Aug. 12, 1939  2 Sheets-Sheet 2

Inventor
René Widmer,
By Wachantha & Groff
Attorneys

Patented Aug. 19, 1941

2,253,258

UNITED STATES PATENT OFFICE 2,253,258

FILM GATE ADJUSTABLE FOR FILMS OF DIFFERENT WIDTHS

René Widmer, Sainte-Croix, Switzerland, assignor to Paillard et Cie S. A., Sainte-Croix, Switzerland, a corporation of Switzerland Application August 12, 1939, Serial No. 289,868
In Switzerland August 26, 1938

12 Claims. (Cl. 88—17)

This invention relates to a film gate for use in projecting as desired films of different widths and pitch.

Devices are already known for projecting in the same apparatus films of different width and different pitch, that is, spacing between perforations. A device of this character is provided with at least one fixed gate member combined with a number of interchangeable spring pressed movable gate members applied thereto by the pressure of springs, and each movable gate member forming with the fixed gate member a passage for the passage of a particular film.

When for example it is desired to pass a film of a narrow width of 8 mm. into existing devices or apparatus which also enables films of a width of 9.5 and 16 mm. to be used, the narrow film is guided on the one hand by a longitudinal rib of the movable gate member and on the other hand by the fixed gate member.

In these known devices in order that the narrow film shall remain flat against the movable gate member opposite the projection opening, the movable gate member is provided with two blade springs on opposite sides of this opening. In order to load the apparatus it is necessary to pass the narrow film under the springs which always remain in the same position.

This known device has the disadvantage that the two spring blades do not present a sufficient supporting surface for ensuring a satisfactory guiding of the narrow film and further the introduction of the film under the two spring blades can only be effected with difficulty. Further, even when the film has been placed under the springs there is the likelihood that they are not in the correct position.

The present invention has for its object to remedy these disadvantages while making provision for the device for guiding the narrow film on the movable gate member to assume two different positions, one for loading or inserting the film, the other for projection. It also enables the guide member to be provided with a sufficient bearing surface in proximity to the projection opening for ensuring satisfactory guiding.

For this purpose my device is provided with a spring pressed movable gate member having at least one marginal stop for the partial guiding of the film as regards width, in combination with a spring actuated guide member adapted to ensure the correct passage of a film of one width (narrow) past the projection opening and extending for a predetermined distance lengthwise of the film, this spring actuated guide member being capable of occupying two different positions, an open position, for the purpose of placing the film of this width in position without difficulty, the other a closed position for the purpose of projection.

A form of construction of the subject of my invention is shown by way of example in the accompanying drawings, wherein Fig. 1 is a partial plan view of the movable gate member and projection aperture showing the spring mounted guide plate for guiding narrow film.

Figure 1:
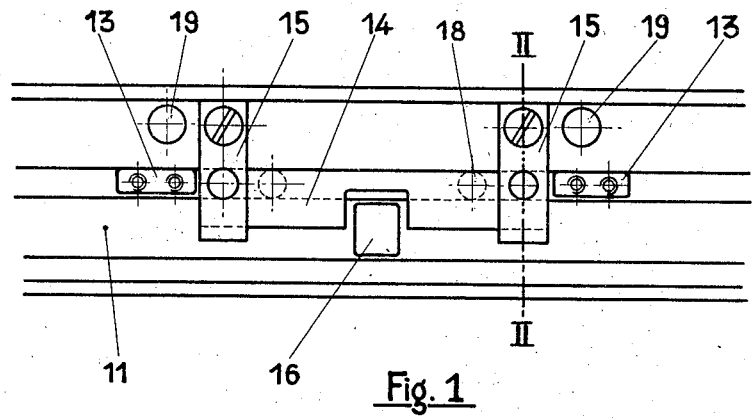

The fixed gate member 10 and the movable gate member 11, which are held in engagement with one another for projection by the pressure of a spring means 20 resting on its supporting base 11a, enable a film 12 of a narrow width of 8 mm. to be guided in the fixed gate member 10 which is so constructed with stepped recesses 21, 21, and 22, 22, that it also permits of the passage of films of wider widths of 9.5 and 16 mm.

The spring pressed part or member 11 of the gate, as is usual in film gates, is resiliently displaceable or movable in the direction of the thickness of the film to keep the film held in place, and is so mounted that it may be readily taken out of operating position when a film is to be inserted or removed. The 8 mm. film 12 has one marginal row of marginal perforations 12c.

Figure 3:
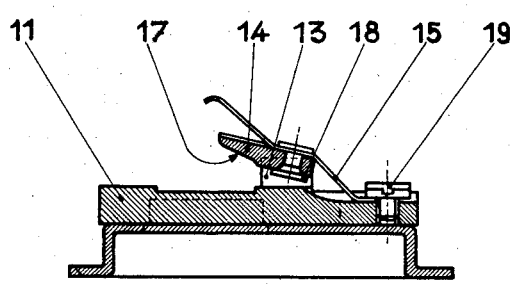
Fig. 3 is a similar view of the movable gate member and guide in the open position.
Figure 4:
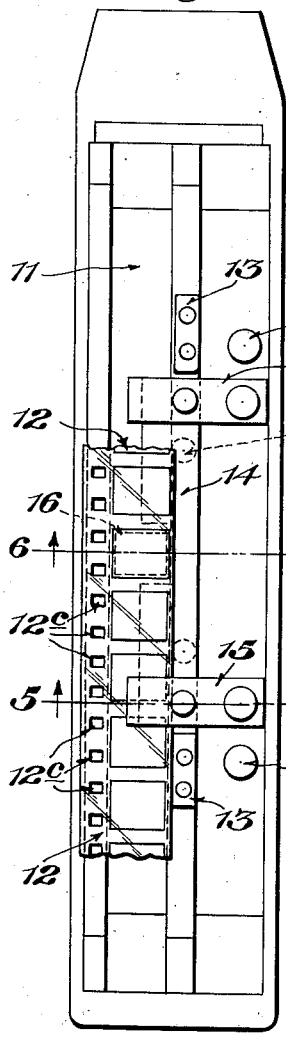
Fig. 4 is a view of a removable gate member with a strip of 8 mm. film in position.
Figure 6:
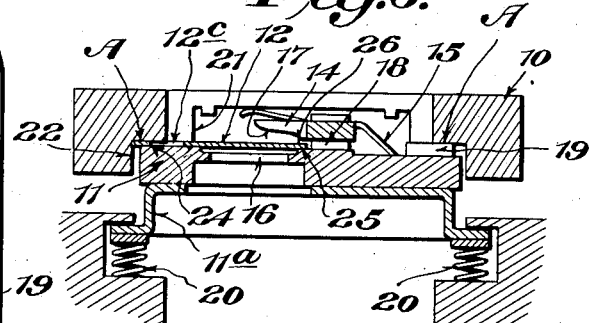
Fig. 6 is a view partly in section on line 6—6 of Fig. 4 through the projecting aperture showing a strip of 8 mm. film in position between the fixed gate member A and the removable gate member and retained by the guide member.
Figure 7:
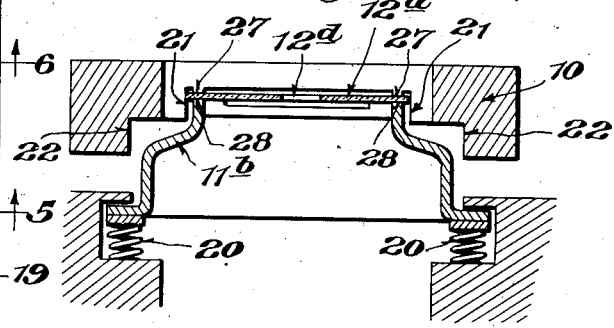
Fig. 7 shows a strip of 9.5 mm. film held by its removable gate member in a recess in the fixed gate member.
Figure 8:
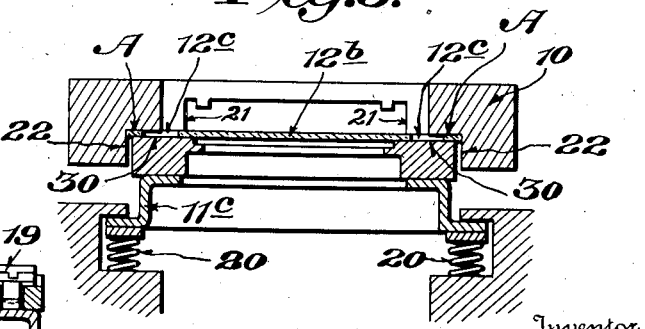
Fig. 8 shows a strip of 16 mm. film held by its removable gate member in a recess in the fixed gate member.
Figure 5:
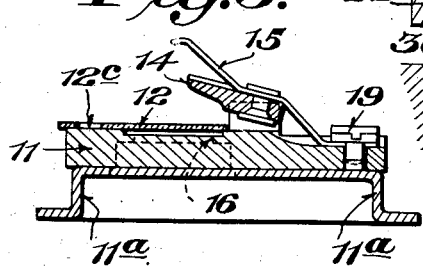
Fig. 5 is a sectional view taken on line 5—5 of Fig. 4 showing a strip of 8 mm. film in position and a spring urged guide member for guiding the film edge.

The movable gate member 11, for the purpose of the partial guiding of the film as regards width, is provided with two stops 13 secured to the movable gate member 11. Between these stops is provided a plate 14 secured to two blade springs 15 of which one end is secured to the spring pressed movable gate member 11, while the other end is bent over outwardly and downwardly in such a manner on to plate 14 and projects thereabove as to normally hold the plate 14 spaced from the movable gate member 11, as shown in Fig. 3, and to come into engagement with the fixed gate member 10 at the deepest portion thereof against the recess formed by walls 21, 21, which normally serves for the passage of a film of a width of 9.5 mm. when another appropriate movable gate member is placed in position. The 8 mm. film 12 is held in place in the thickness direction on one side between the contacting surface 24 of movable gate member 11 near its outer edge, and the surface A of fixed gate member 10, and on its other side between the contacting surface 25 of movable gate member 11 and the contacting surface 26 of guiding member 14. For facilitating the introduction of the narrow 8 mm. film 12, the plate 14 is provided with an inclined surface 17.

The clamping of the 8 mm. film 12 between the spring pressed movable gate member 11 and the plate 14 is limited by a plate spacer or stop 18. The height of this stop may be adjusted very accurately, thus avoiding any possibility of the 8 mm. film being wedged at this point. The stop 18 may form a portion of the attaching member or bolt for securing the plate 14 to the springs 15.

Opposite the projection opening 16 of the spring pressed gate member 11, the plate 14 is provided with a corresponding notch.

Figure 2:
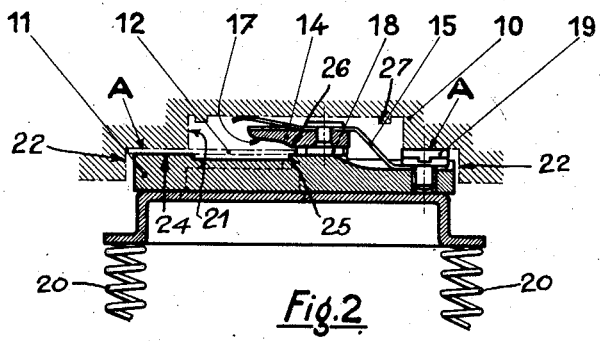
Fig. 2 is a section of the movable gate member and of the guide and of the fixed gate member on the line II—II of Fig. 1 in the closed position and to a larger scale.

In the fixed gate member shown in Fig. 2, the surfaces A, A of the fixed gate member 10 normally serve to support the two edges of a wide film 12b which is of greater width (for example 16 mm.) than the narrow 8 mm. film 12 and are guided by walls 22, 22. As the narrow film 12 only rests against one of the surfaces A, the spring pressed movable gate member 11 is provided on the opposite side with two gate spacers or stops 19 adapted to hold the movable gate member 11 transversely parallel to the fixed gate member 10, that is to say for compensating the thickness of the film on the surface A which is not used. These spacers or stops are formed by two screws which can be adjusted with the necessary precision.

This device is of the greatest importance, since a deviation, even if only very small, in the transverse parallelism of the surfaces of the movable gate member and of the fixed gate member, moves the plane of the film relatively to the optical axis in such a manner that it is no longer perpendicular to the latter, which is noticeable during projection since certain parts lack in clearance.

The movable gate member 11 is thus provided with a guiding device being the plate 14 for narrow film which opens automatically under the action of the springs 15 when the removable gate member is disengaged from the fixed gate member 10 either for loading a film or for removing the film.

After introducing the film under the plate 14, this guiding device 14 automatically takes up its correct position when the movable gate member is placed in position in the fixed gate member 10 and ensures the resilient guiding of the film thus enabling the latter to pass without undesirable resistance in a correct position into the channel formed by the fixed gate member 10 and the spring pressed movable gate 11.

For projecting the 9.5 mm. film 12a having central perforations 12d, there is employed a movable gate member 11b which cooperates with the deepest recess of the fixed gate member 10, and for projecting the 16 mm. film 12b there is employed a movable gate member 11c which cooperates with the widest reach of the fixed gate member and applies the edges of the 16 mm. film 12b to the two outer surfaces A, A of fixed gate member 10. The 9.5 mm. film 12a is held in place in the thickness direction between the contacting surfaces 28, 28 of movable gate member 11b, and flat contacting surfaces 27, 27 of the deepest recess of fixed gate member 10.

The guiding member or plate 14 need only be provided with one spring or may be formed by a spring blade of suitable shape. The spacers or stops 19 may be formed by members other than screws, for example by two connected parts or by milling or machining the two edges of the movable gate member to different heights.

I claim:

1. A device for use in cinematographic apparatus for the projection of films of different widths and pitch, said device comprising at least one fixed gate member, at least one movable gate member operatively associated with the fixed gate member, said gate members forming between them a passage for the passage of a film, at least one marginal stop on said movable gate member for the film of less width, said stop serving for the partial guiding of the film as regards its width, a spring actuated guide member on said movable gate member, said spring actuated member being adapted to ensure the correct passage of the film past a projection opening and extending along a predetermined length of said film, said spring actuated member being adapted to occupy two different positions, an open position for the purpose of enabling the film to be readily placed in position, and a closed position for the purpose of projection.

2. A device according to claim 1, including at least one spring secured to said movable gate member and to said spring actuated member, said spring being so arranged as to hold the spring actuated member away from said movable gate member when the latter is disengaged from the fixed gate member and to move said spring actuated member into its correct position relatively to the said movable gate member when the latter is in engagement with the fixed gate member.

3. A device according to claim 1, including at least one spring secured to said movable gate member and to said spring actuated member, said spring being adapted to bear against said fixed gate member when the movable gate member is placed in position on the fixed gate member.

4. A device according to claim 1, wherein said fixed gate member is provided with recesses of various depths for accommodating films of different dimensions, and including at least one spring connected to said movable gate member and to said spring actuated member, said spring engaging with the portion of the fixed gate member having the recess of greatest depth and normally utilised for forming together with another movable gate member a passage for a film of other dimensions.

5. A device according to claim 1, wherein said spring actuated member is formed by a plate, at least one blade spring being secured to said movable gate member and to said plate, said spring having an end extending beyond said plate, said end being curved and being adapted to bear against said fixed gate member when the movable gate member is placed in position.

6. A device according to claim 1, wherein said spring actuated member consists of a spring blade of sufficient width, said spring blade being curved in such a manner as to form a bearing surface for the film.

7. A device according to claim 1, including at least one spacing stop on said spring actuated member, said stop being adapted to limit the spacing between said spring actuated member and said movable gate member so as to permit of the passage of the film under frictional resistance of such value as to permit normal operation.

8. A device according to claim 1, wherein the film only passes at one of its sides between the movable gate member and the fixed gate member, at least one stop being secured to said movable gate member on the side thereof opposite that against which the film bears, said stop being adapted to compensate the thickness of the film for the purpose of ensuring satisfactory transverse parallelism between the surfaces of the movable gate member and the fixed gate member and consequently also the position of the film relatively to the optical axis.

9. In a film gate for films of different widths, a fixed gate member, a movable gate member, said gate members being mounted for the passage of a strip of film therebetween, a fixed lateral stop fixedly mounted on said movable gate member and positioned for guiding one margin of the film, said fixed gate member comprising means for retaining said film in lateral position abutting said fixed lateral stop, holding means for holding said film in flat registering position on said movable gate member and being mounted for selective adjustment on said movable gate member into either an open loading position or a closed holding position, and resilient retaining means cooperating with said holding means for normally retaining said holding means in closed holding position flat against said film.

10. In a film gate for films of different widths, a fixed gate member provided with a plurality of stepped recesses, the dimensions of said recesses being adapted to receive films of different widths respectively, a movable gate member for film narrower than the narrowest of said recesses, said movable gate member being receivable in a said recess other than the said recess which is most deeply recessed and comprising a guide carried on the face of said movable gate member adapted to engage said narrow film and being positioned to retain said narrow film between its guiding edge and a wall of said recess wherein said movable gate member is received, said guide extending into the said recess which is next deeper than the said recess wherein said movable gate member is received.

11. A film gate according to claim 10, said guide being pivotally mounted on said movable gate member and comprising resilient means engageable with the base face of said next deeper recess for holding said guide tightly against said movable gate member.

12. A film gate according to claim 10, and an adjustable spacer carried on the face of said movable gate member traversed by said narrow film but adjacent the extreme outer edge thereof opposite the edge of said movable gate member traversed by said narrow film, said spacer being engageable with said fixed gate member for maintaining uniform spacing between said fixed gate member and said movable gate member across their entire width for the passage of said narrow film therebetween, said guide being provided with an adjustable spacer adapted to engage the face of said movable gate member which is traversed by said narrow film for adjusting the space between said guide and said face.

RENÉ WIDMER.